(12) United States Patent
Nakaoka

(10) Patent No.: US 12,399,396 B2
(45) Date of Patent: Aug. 26, 2025

(54) DISPLAY DEVICE

(71) Applicant: Magnolia White Corporation, Tokyo (JP)

(72) Inventor: Chikyu Nakaoka, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/886,826

(22) Filed: Sep. 16, 2024

(65) Prior Publication Data

US 2025/0102864 A1    Mar. 27, 2025

(51) Int. Cl.
    *G02F 1/1335*    (2006.01)
(52) U.S. Cl.
    CPC .. *G02F 1/133607* (2021.01); *G02F 1/133526* (2013.01)
(58) Field of Classification Search
    CPC ......... G02F 1/133607; G02F 1/133526; G02F 1/133631; G02F 1/133632; G02F 1/13373; G02F 1/1395; G02F 1/0311; G02F 1/3503; G02B 30/29; G02B 30/32; G02B 30/27; G02B 30/28; H04N 13/317; H04N 13/305; H04N 13/31; G09F 9/30
    See application file for complete search history.

(56) References Cited

U.S. PATENT DOCUMENTS

| | | | | |
|---|---|---|---|---|
| 5,101,279 A | * | 3/1992 | Kurematsu | .......... H04N 5/7441 |
| | | | | 359/623 |
| 5,398,125 A | * | 3/1995 | Willett | .............. G02F 1/133526 |
| | | | | 349/5 |
| 2019/0353916 A1 | | 11/2019 | Koito et al. | |

FOREIGN PATENT DOCUMENTS

JP    2019-204075 A    11/2019

* cited by examiner

*Primary Examiner* — Omar Rojas Cadima
(74) *Attorney, Agent, or Firm* — K&L Gates LLP

(57) ABSTRACT

A display device includes a display panel having a display area in which a plurality of pixels are provided, a first optical member provided on a display surface side of the display panel so as to cover the display area, a second optical member provided on an opposite side to the first optical member with the display panel interposed therebetween, and a light source part that is provided on an opposite side to the display panel with the second optical member interposed therebetween and is configured to emit light an optical path of which is along a facing direction in which the first optical member and the second optical member face each other.

7 Claims, 11 Drawing Sheets

DISPLAY DEVICE

CROSS-REFERENCE TO RELATED APPLICATION

This application claims the benefit of priority from Japanese Patent Application No. 2023-156375 filed on Sep. 21, 2023, the entire contents of which are incorporated herein by reference.

BACKGROUND

1. Technical Field

The present disclosure relates to a display device.

2. Description of the Related Art

Display devices with what is called a multi-view function that is capable of outputting a different image to each of a plurality of viewpoints have been known (see, for example, Japanese Patent Application Laid-open Publication No. 2019-204075).

In a display device with a multi-view function, reverse viewing occurs in which an image are reversed horizontally when the display device is viewed at a viewpoint angle outside an assumed viewing angle range. Thus, to make it impossible or difficult to view images at viewpoint angles outside the assumed viewing angle, it has been expected to limit in advance the angular range of light output from the display device to a range closer to the assumed viewing angle range.

For the foregoing reasons, there is a need for a display device that facilitates limiting the angular range of output light to a range closer to an assumed viewing angle range.

SUMMARY

A display device according to an embodiment of the present disclosure includes a display panel having a display area in which a plurality of pixels are provided, a first optical member provided on a display surface side of the display panel so as to cover the display area, a second optical member provided on an opposite side to the first optical member with the display panel interposed therebetween, and a light source part that is provided on an opposite side to the display panel with the second optical member interposed therebetween and is configured to emit light an optical path of which is along a facing direction in which the first optical member and the second optical member face each other. Each of the first optical member and the second optical member includes a plurality of convex lens parts arranged in a first direction orthogonal to the facing direction, the convex lens parts each have a curvature in the first direction and no curvature in an extending direction, the extending direction is a direction that is orthogonal to the facing direction and that intersects both the first direction and a second direction that is orthogonal to the facing direction and the first direction, and the extending direction of each convex lens part of the first optical member and the extending direction of each convex lens part of the second optical member are line symmetric with respect to the second direction.

DETAILED DESCRIPTION

Embodiments of the present disclosure will be described below with reference to the drawings. What is disclosed herein is merely an example, and any appropriate modification that would easily be conceived of by a person skilled in the art, while maintaining the purport of the invention, is naturally included in the scope of the present disclosure. The drawings may schematically illustrate the width, thickness, shape, and the like of each part compared with the actual mode for the sake of clarity of description, but this is merely an example and does not limit the interpretation of the present disclosure. In the present specification and the drawings, elements similar to those described previously with respect to the drawings already mentioned are given the same reference signs and the detailed description thereof may be omitted as appropriate.

Figure 1:
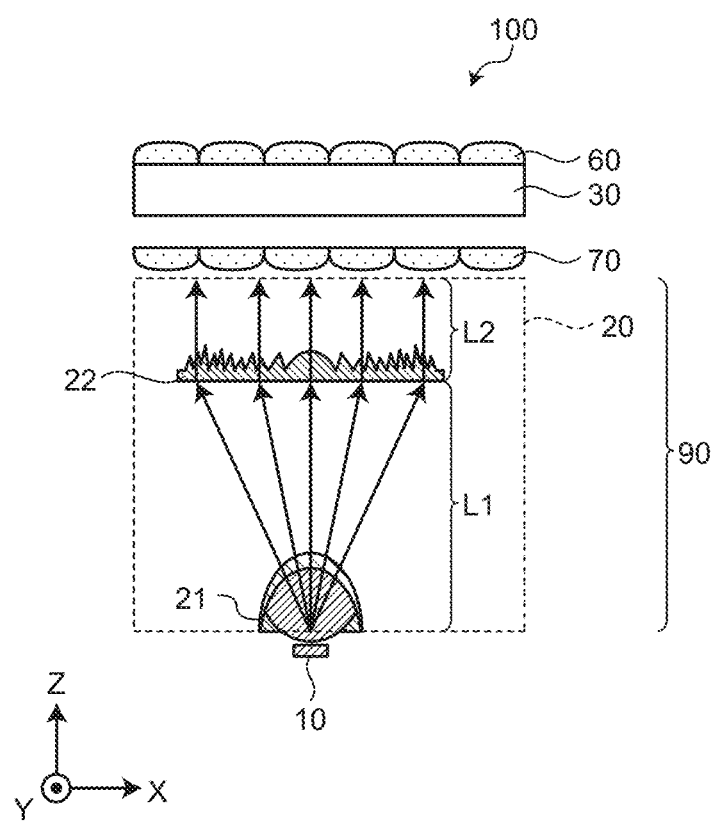
FIG. 1 is a schematic view illustrating a main configuration of a display device.

FIG. 1 is a schematic view illustrating a main configuration of a display device 100. The display device 100 includes a light source 10, a collimator 20, a display panel 30, a first optical member 60, and a second optical member 70.

As illustrated in FIG. 1, the display device 100 has the first optical member 60 and the second optical member 70 facing each other with the display panel 30 interposed therebetween. The collimator 20 is placed on the opposite side to the display panel 30 with the second optical member 70 interposed therebetween, and the light source 10 is placed on the opposite side to the second optical member 70 with the collimator 20 interposed therebetween. The facing direction in which the first optical member 60 and the second optical member 70 face is a facing direction Z. One of two directions orthogonal to the facing direction Z is a first direction X, and the other is a second direction Y.

In the display device 100 of an embodiment, the display panel 30 and the first optical member 60 are substantially identical in shape and area when the X-Y plane is viewed from a front viewpoint. At least the first optical member 60 covers a display area OA (see FIG. 2) described later. Hereinafter, when the front viewpoint is mentioned, it refers to the viewpoint at which the X-Y plane is viewed from the front viewpoint and the display device 100 is viewed from the first optical member 60 side. The dimensions of components and the distances between the components in the first direction X and the facing direction Z illustrated in FIG. 1 are not strictly indicative of the actual dimensions of the components and the actual distances between the components. FIG. 1 illustrates merely the relative positional relation between the components included in the main configuration of the display device 100.

The light source 10 emits light. Specifically, the light source 10 functions as a point light source, such as a light emitting diode (LED), for example. The light source 10 of the embodiment is provided so as to emit scattered light toward the display panel 30.

The collimator 20 directs optical paths of light emitted from the light source 10 more along the facing direction Z so that the light reaches the second optical member 70. Specifically, the collimator 20 illustrated in FIG. 1 has a convex lens 21 and a Fresnel lens 22.

The convex lens 21 is provided closer to the light source 10 than the Fresnel lens 22 is. The convex lens 21 is shaped along the X-Y plane on the light source 10 side and shaped like a hemisphere on the Fresnel lens 22 side, for example. The convex lens 21 converges the light emitted from the light source 10 to some extent and directs it to the Fresnel lens 22. Light L1 that enters the convex lens 21 and reaches the Fresnel lens 22 travels along diffused optical paths that expand in the X-Y planar viewpoint.

The Fresnel lens 22 is provided between the convex lens 21 and the second optical member 70. The Fresnel lens 22 refracts the light so that the light that have been emitted from the light source 10 and passed through the convex lens 21 travels along the facing direction Z. Light L2 that passes through the Fresnel lens 22 and reaches the second optical member 70 mostly travels along the facing direction Z. The Fresnel lens 22 is not limited to a Fresnel lens, and may be any other optical member (for example, collimator lens) that refracts optical paths in a similar manner.

In the embodiment, the light source 10 and the collimator 20 constitute a light source part 90. The light source part 90 functions as a light source part that emits light the optical paths of which are along the facing direction (facing direction Z) in which the first optical member 60 and the second optical member 70 face each other. The convex lens 21 is not indispensable in the collimator 20, and any configuration in which the optical paths of the light emitted from the light source 10 to the Fresnel lens 22 and the degree of refraction of the light by the Fresnel lens 22 are set such that most of the light transmitted from the Fresnel lens 22 travels along the facing direction Z, can function as the light source part 90 according to the present embodiment.

The following describes the display panel 30 and the first optical member 60 with reference to FIGS. 2 through 5. As viewed from the display panel 30, the first optical member 60 side is a display surface side.

Figure 2:
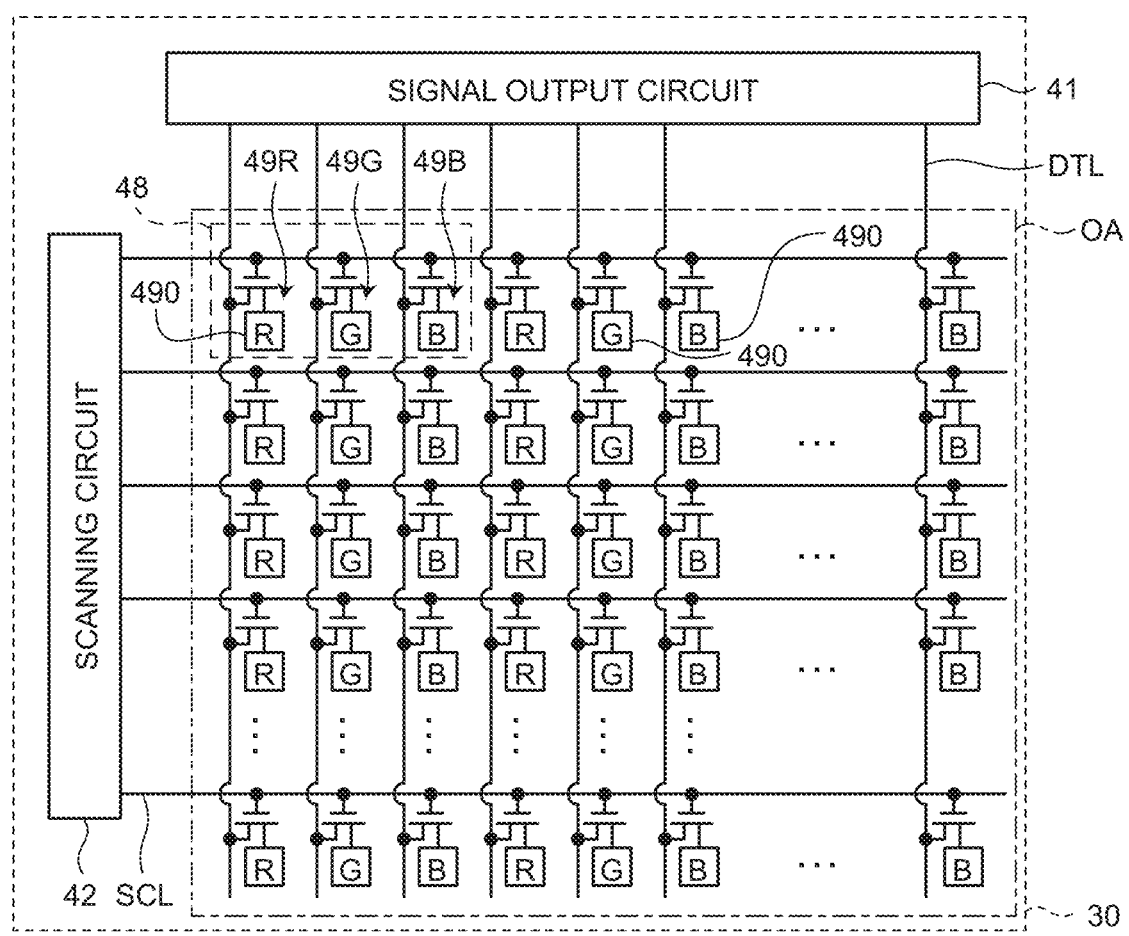
FIG. 2 is a diagram illustrating an example of a pixel arrangement of a display panel.

FIG. 2 is a diagram illustrating an example of a pixel arrangement of the display panel 30. As illustrated in FIG. 2, a pixel 48 has, for example, a first sub-pixel 49R, a second sub-pixel 49G, and a third sub-pixel 49B. The first sub-pixel 49R displays a first primary color (for example, red). The second sub-pixel 49G displays a second primary color (for example, green). The third sub-pixel 49B displays a third primary color (for example, blue). In this manner, the pixels 48 arranged in a matrix (row-column configuration) on the display panel 30 each include the first sub-pixel 49R that displays the first color, the second sub-pixel 49G that displays the second color, and the third sub-pixel 49B that displays the third color. The first, second, and third colors are not limited to the first, second, and third primary colors, and may be complementary or other colors different from each other. In the following description, the first sub-pixel 49R, the second sub-pixel 49G, and the third sub-pixel 49B are referred to as sub-pixels 49 when they need not be distinguished from one another.

A plurality of the sub-pixels 49 are disposed along the X-Y plane. Hereinafter, an area in which the sub-pixels 49 are disposed is described as the display area OA.

The pixel 48 may have another sub-pixel 49 in addition to the first sub-pixel 49R, the second sub-pixel 49G, and the third sub-pixel 49B. For example, the pixel 48 may have a fourth sub-pixel that displays a fourth color. The fourth sub-pixel displays the fourth color (for example, white). The fourth sub-pixel is preferably brighter than the first sub-pixel 49R that displays the first color, the second sub-pixel 49G that displays the second color, and the third sub-pixel 49B that displays the third color when illuminated by the same light source lighting amount.

The display device 100 is more specifically a transmissive color liquid crystal display device. As illustrated in FIG. 2, the display panel 30 is a color liquid crystal display panel in which a first color filter is placed between the first sub-pixel 49R and a person viewing an image (image viewer), a second color filter is placed between the second sub-pixel 49G and the image viewer, and a third color filter is placed between the third sub-pixel 49B and the image viewer. The first color filter transmits the first primary color, the second color filter transmits the second primary color, and the third color filter transmits the third primary color.

When the fourth sub-pixel is provided, no color filter is placed between the fourth sub-pixel and the image viewer. In this case, a large level difference in height is generated at the fourth sub-pixel. For this reason, the fourth sub-pixel may include a transparent resin layer instead of a color filter. This configuration can reduce the generation of the large level difference in height at the fourth sub-pixel.

A signal output circuit 41 is electrically coupled to the display panel 30 by signal lines DTL. A scanning circuit 42 selects the sub-pixels 49 on the display panel 30 and controls switching elements (for example, thin film transistors (TFTs)) for controlling the operation (light transmittance) of the sub-pixels 49 to be turned on and off. The scanning circuit 42 is electrically coupled to the display panel 30 by scanning lines SCL.

In the first embodiment, a plurality of the signal lines DTL are arranged in the first direction X. Each signal line DTL extends in the second direction Y. A plurality of the scanning lines SCL are arranged in the second direction Y. Each scanning line SCL extends in the first direction X. Consequently, in the first embodiment, the pixels 48 are driven for each pixel row (line) including a plurality of the pixels 48 arranged in the first direction X to share the scanning line SCL, according to a drive signal output from the scanning circuit 42. The direction along which each scanning line SCL extends is a horizontal scanning direction. The direction in which the scanning lines SCL are arranged is a vertical scanning direction. In the first embodiment, the first direction X corresponds to the horizontal scanning direction, and the second direction Y corresponds to the vertical scanning direction.

Figure 6:
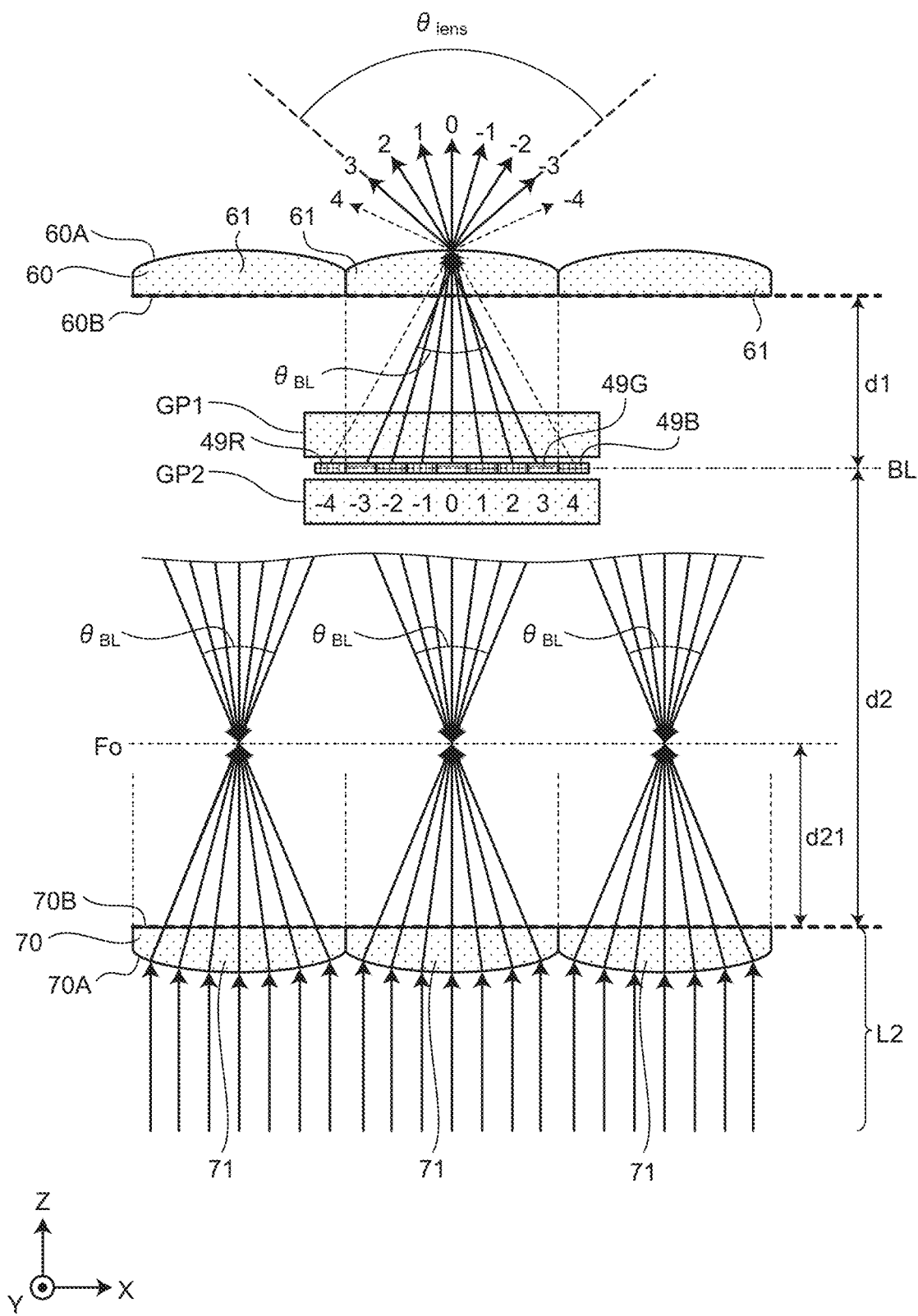
FIG. 6 is a schematic view to illustrate an optical effect produced by the display panel, the first optical member, and a second optical member.

As illustrated in FIG. 6 described later, the display panel 30 has a first substrate GP1 and a second substrate GP2. The first substrate GP1 and the second substrate GP2 are light-transmitting substrates, such as glass substrates, for example. The first substrate GP1 is provided with switching elements for controlling the operation (light transmittance) of the sub-pixels 49, pixel electrodes 490 (see FIG. 2) that are coupled to the switching elements and provided for each sub-pixel 49, the signal output circuit 41, the scanning circuit 42, the signal lines DTL, and the scanning lines SCL. The second substrate GP2 is provided with a color filter layer including the first color filter, the second color filter, and the third color filter.

The first substrate GP1 and the second substrate GP2 are placed so as to face each other with a liquid crystal layer interposed therebetween. Liquid crystal molecules in the liquid crystal layer are controlled in an oriented state according to the relation between the potential of each of the pixel electrodes 490 and the potential of a common electrode. The light transmittance of each sub-pixel 49 depends on the oriented state of the liquid crystal molecules located on the pixel electrode 490 in the sub-pixel 49.

The common electrode is provided on the first substrate GP1, for example, but may be provided on the second substrate GP2. The common electrode and the pixel electrode 490 are light-transmitting electrodes, and are formed using indium tin oxide (ITO), for example, as a material. The common electrode is given a predetermined potential. The potential of the pixel electrode 490 corresponds to a pixel signal transmitted through the signal line DTL and the switching element. The pixel signal depends on image data that is externally input to the display device 100. In this manner, the display device 100 achieves image display output by operating the sub-pixels 49 in accordance with the image data.

Although not illustrated, polarizing layers are provided on the first optical member 60 side of the display panel 30 and on the second optical member 70 side of the display panel 30. These polarizing layers each transmit polarization components in a predetermined direction and blocks polarization components in other directions. The direction of the polarization components transmitted by these polarizing layers is predetermined according to the initial orientation of liquid crystal molecules in a liquid crystal layer LC.

The first optical member 60 is a light-transmitting optical member with convex lens parts 61 formed on one surface side. The convex lens parts 61 function as convex lenses to achieve a multi-view function. The multi-view function refers to a function to output images for a plurality of viewpoints simultaneously.

Figure 3:
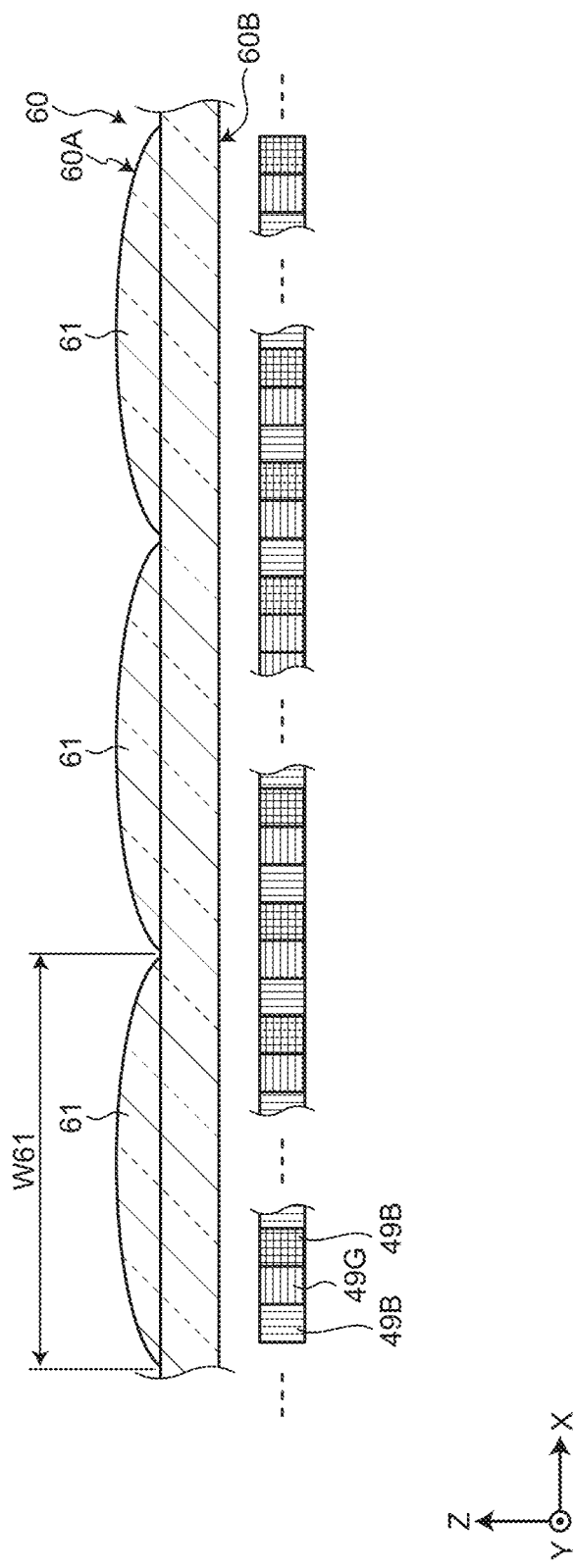
FIG. 3 is a diagram illustrating relation between convex lens parts and sub-pixels.

FIG. 3 is a diagram illustrating relation between the convex lens parts 61 and the sub-pixels 49. As illustrated in FIG. 3, the sub-pixels 49 are arranged within a width W61. The width W61 is the width in the first direction X of one convex lens part 61. When the sub-pixel 49 receives light from the side of the sub-pixel 49 opposite to the first optical member 60 side thereof, the traveling direction of the light transmitted through the sub-pixel 49 in the facing direction Z is affected by refraction by the convex lens part 61. Specifically, the traveling direction of light passing through a position of the arc-shaped emission surface formed on one surface 60A side of the convex lens part 61, other than the central position of the first direction X, changes from the facing direction Z to a direction intersecting the facing direction Z. Thus, the light rays transmitted through the sub-pixels 49 in the facing direction Z reach viewpoints at different positions. In the embodiment, the convex lens part 61 causes the light rays transmitted through different sub-pixels 49 to reach different viewpoints, thereby establishing a multi-view.

As illustrated in FIG. 3, the plurality of convex lens parts 61 are provided. The convex lens parts 61 are arranged in the first direction X. The longitudinal direction of each convex lens part 61 is inclined with respect to the first direction X and the second direction Y. The inclination of the convex lens part 61 in the longitudinal direction will be described below with reference to FIGS. 4 and 5.

Figure 4:
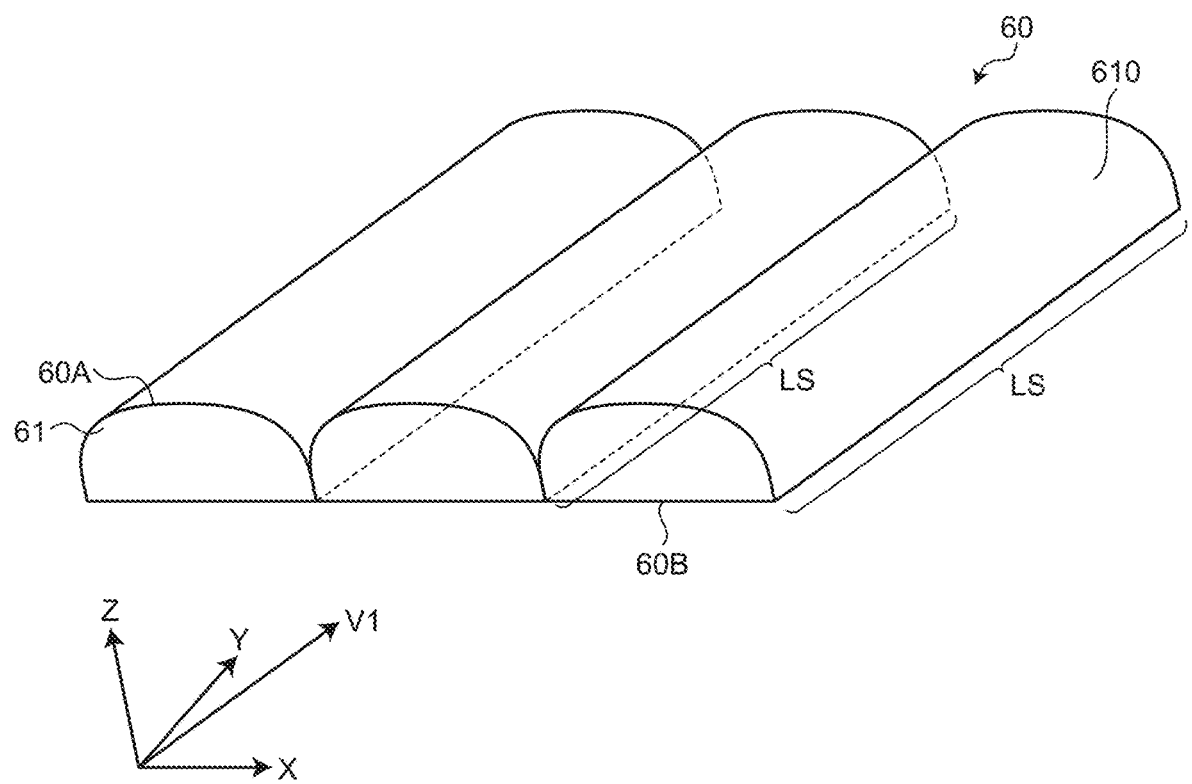
FIG. 4 is a perspective view illustrating a structure of a first optical member.
Figure 5:
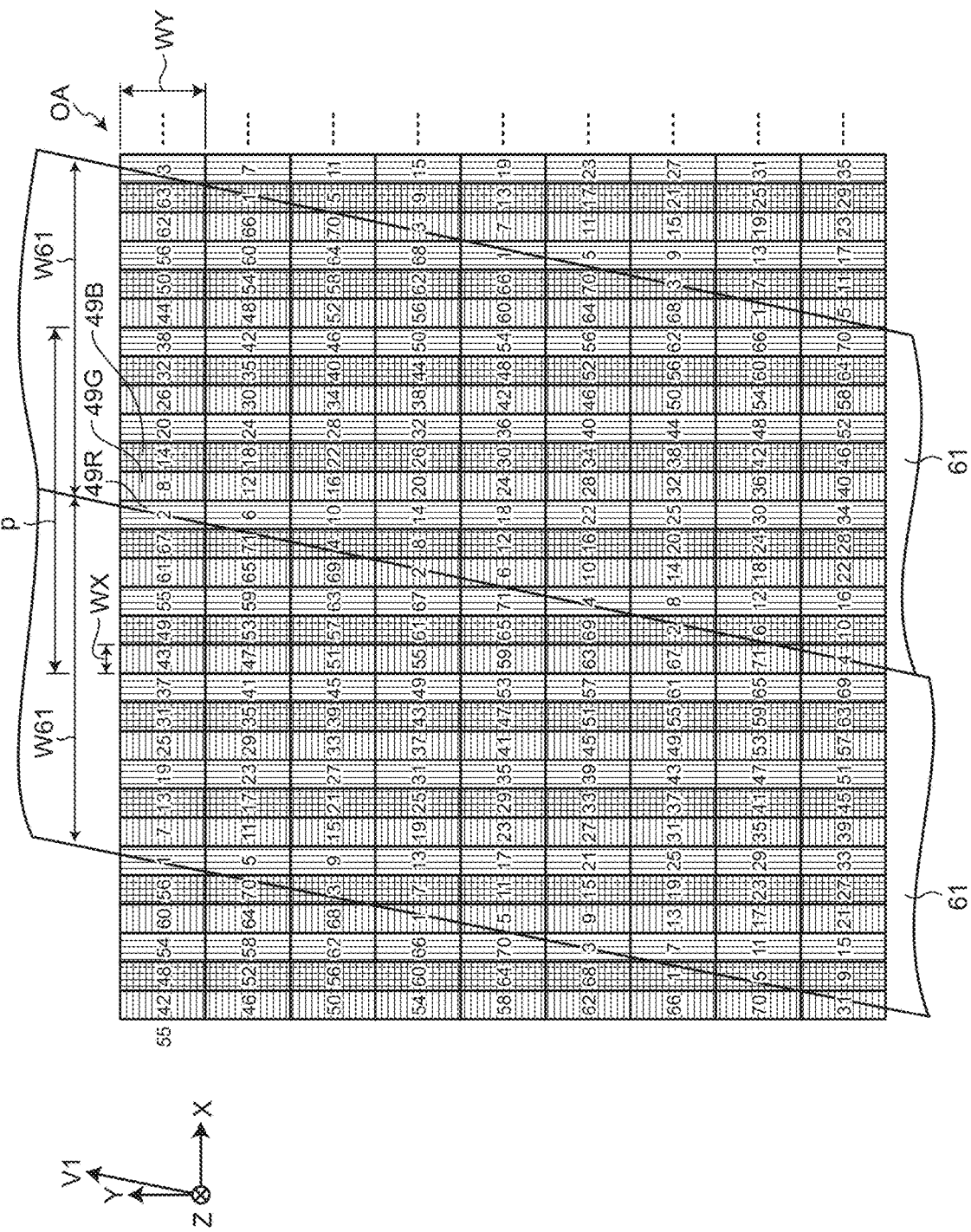
FIG. 5 is a diagram illustrating an example of relation between an arrangement of sub-pixels in a display area and an inclination of the convex lens parts.

FIG. 4 is a perspective view illustrating a structure of the first optical member 60. FIG. 5 is a diagram illustrating an example of relation between the arrangement of the sub-pixels 49 in the display area OA and the inclination of the convex lens parts 61. As illustrated in FIGS. 2 and 5, the sub-pixels 49 are arranged in a matrix (row-column configuration) in the first direction X and second direction Y, for example. Specifically, in the display area OA, a pixel column in which the first sub-pixels 49R are arranged in the second direction Y, a pixel column in which the second sub-pixels 49G are arranged in the second direction Y, and a pixel column in which the third sub-pixels 49B are arranged in the second direction Y are alternately arranged in the first direction X. In contrast to this, the long sides of the convex lens part 61 are along a first extending direction V1, which is the direction intersecting the first direction X and the second direction Y in the X-Y plane orthogonal to the facing direction Z, as illustrated in FIGS. 4 and 5. That is, the longitudinal direction of each convex lens part 61 is along the first extending direction V1. In the embodiment, the angle (angle $\varphi$ illustrated in FIG. 7) between the first extending direction V1 and the second direction Y is smaller than the angle between the first extending direction V1 and the first direction X. The long sides of the convex lens part 61 are two sides that are located at the ends of the arc (see FIG. 3) of the convex lens part 61 in the first direction X, and that border the ends of the width W61 in the first direction X, respectively. In FIG. 4, a long side LS is illustrated with a reference sign LS for a convex lens part 610, which is one of the convex lens parts 61.

The convex lens part 61 has no curvature in the first extending direction V1. The radius of curvature that causes the convex lens part 61 to have optical properties as a convex lens is set in a direction orthogonal to the facing direction (facing direction Z) in which the first optical member 60 and the second optical member 70 face each other and also orthogonal to the longitudinal direction. In other words, the convex lens part 61 has a structure that exhibits curvatures in directions other than the first extending direction V1 in the X-Y plane. Consequently, the convex lens part 61 has a curvature in the first direction X. The first extending direction V1, which is the longitudinal direction of the convex lens part 61, can be said to be the extending direction of the convex lens part 61 with a cylindrical surface.

The longitudinal direction of each convex lens part 61 is inclined with respect to the first direction X and the second direction Y, making it easier to reduce cross talk than a case in which the longitudinal direction is along the second direction Y. Cross talk herein refers to a phenomenon in which, in the correspondence between the sub-pixels 49 and the viewpoints, light from a sub-pixel 49 that does not correspond to a certain viewpoint unintentionally reaches that certain viewpoint.

The number given to each sub-pixel 49 in FIG. 5 indicates a corresponding viewpoint. That is, the sub-pixels 49 to which different numbers are given correspond to different viewpoints. In FIG. 5, rectangular sub-pixels 49 with a length WY in the second direction Y longer than a width WX in the first direction X are arranged in a matrix (row-column configuration) in the display area OA. However, the shape and arrangement of the sub-pixels 49 are not limited to this, and may be modified as appropriate. The relation between the number of sub-pixels 49 arranged in the first direction X and a pitch p of the convex lens parts 61 in the first direction X is not limited to the example illustrated in FIG. 5, and may be modified as appropriate depending on the number of viewpoints intended in the multi-view design. There is no relation between the integer values of "−4", "−3", "−2", "−1", "0", "1", "2", "3", and "4" given in FIG. 6 described later and the numbers given in FIG. 5.

As illustrated in FIGS. 3, 4, and 5 as well as FIG. 6 described later, the side of the first optical member 60 on which the convex lens parts 61 are formed is the one surface 60A. The side of the first optical member 60 opposite the one surface 60A is another surface 60B. The other surface 60B is planar along the X-Y plane.

In the embodiment, the other surface 60B and one surface of the display panel 30 on the first optical member 60 side may be bonded through an adhesive layer with the aforementioned polarizing layer interposed therebetween. The adhesive layer is a film-like double-sided tape having a light-transmitting property, such as an optical clear adhesive (OCA), for example.

Figure 7:
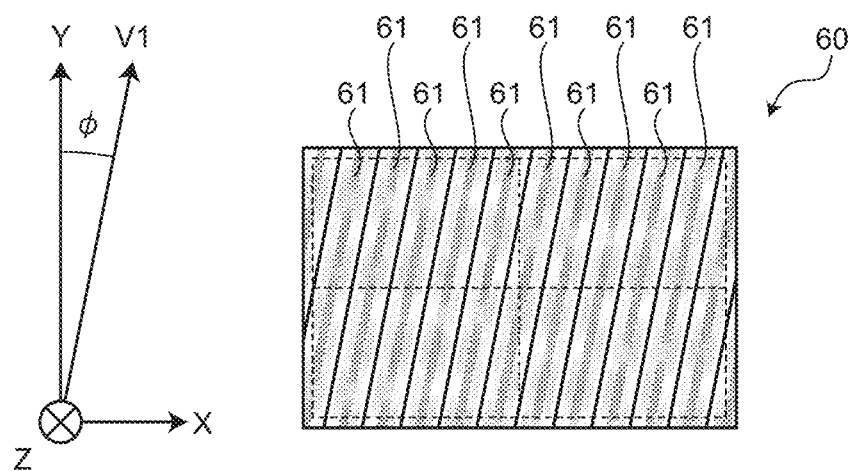
FIG. 7 is a schematic view from a front viewpoint illustrating a longitudinal direction of the convex lens part in the first optical member.
Figure 8:
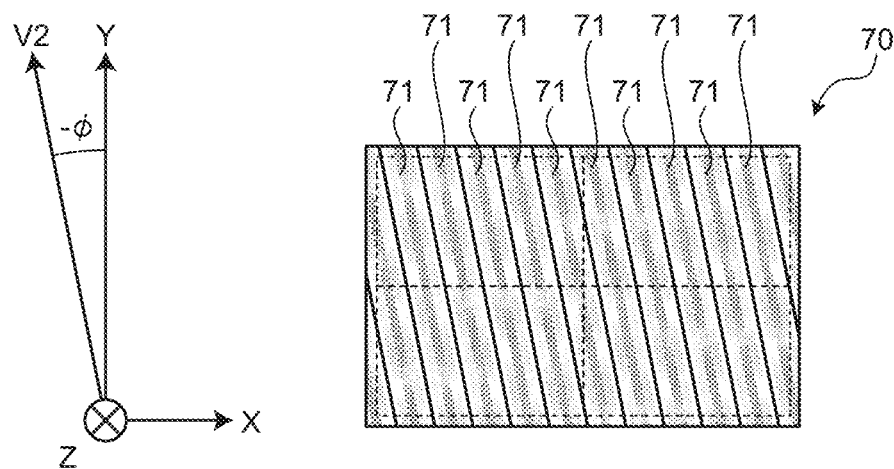
FIG. 8 is a schematic view from a front viewpoint illustrating a longitudinal direction of the convex lens part in the second optical member.

The following describes the second optical member 70 with reference to FIGS. 6 through 8.

FIG. 6 is a schematic view to illustrate an optical effect produced by the display panel 30, the first optical member 60, and a second optical member 70. The second optical member 70 is a light-transmitting optical member in which convex lens parts 71 are formed on one surface 70A on the collimator 20 side (see FIG. 1) and another surface 70B on the display panel 30 side is planar along the X-Y plane. Thus, the second optical member 70 causes the optical paths of the light L2 along the facing direction Z to converge, as illustrated in FIG. 6.

Light that has passed through the second optical member 70 converges within a focal distance d21 from the second optical member 70 to a focal point Fo, and travels along diffused optical paths toward the display panel 30 side beyond the focal point Fo. As illustrated in FIG. 6, a second distance d2 between each of the convex lens parts 71 and a reference line BL is significantly greater than the focal distance d21. The reference line BL indicates the position in the facing direction Z at which the pixel electrode 490 (see FIG. 2) of each sub-pixel 49 is provided in the display panel 30. Consequently, light that travels along a diffused optical path enters the sub-pixel 49.

In FIG. 6, for the purpose of simplifying the relation between the optical paths of light passing through the sub-pixels 49 of the display panel 30 and the optical paths of light after passing through the first optical member 60, integer numbers in the range of −4 to 4 are given to the first sub-pixel 49R, the second sub-pixel 49G, the third sub-pixel 49B, and the light after passing through the first optical member 60. Specifically, "−4", "−3", "−2", "−1", "0", "1", "2", "3", and "4" are given in this order to the sub-pixels 49 arranged in the order of the first sub-pixel 49R, the second sub-pixel 49G, the third sub-pixel 49B, the first sub-pixel 49R, the second sub-pixel 49G, the third sub-pixel 49B, the first sub-pixel 49R, the second sub-pixel 49G, and the third sub-pixel 49B from one side to the other side in the first direction X in FIG. 6. A ray of light passing through the second sub-pixel 49G and given "0" is along the facing direction Z. Rays of light to which negative integers ("−4", "−3", "−2", "−1") are given are inclined to one side of the first direction X relative to the facing direction Z. Rays of light to which positive integers ("1", "2", "3", "4") are given are inclined to the other side of the first direction X relative to the facing direction Z. The light to which a certain integer is given in FIG. 6 is the light that has passed through the sub-pixel 49 to which the same integer is given.

In FIG. 6, a case is assumed in which a viewing angle range $\theta_{lens}$ illustrated on the opposite side to the display panel 30 with the first optical member 60 interposed therebetween is a desired angular range (optimum viewing range) for viewing the display output from the display device 100. In this case, it is desirable that the emitted light to which "−3", "−2", "−1", "0", "1", "2", and "3" are given should emit from the first optical member 60, and that the emitted light to which "−4" and "4" are given should not emit from the first optical member 60. In other words, the viewing angle range $\theta_{lens}$, the optimum viewing range, is the angular range between "−3" and "3".

The curved surface of the one surface 60A formed by the convex lens part 61 causes refraction at the interface between the one surface 60A and the air in contact with the one surface 60A. As a result, the viewing angle range $\theta_{lens}$ is a larger angular range than an angular range $\theta_{BL}$ between "−3" and "3" at the point of incidence into the first optical member 60. Assuming that the light L2 is light along the facing direction Z, the angular range $\theta_{BL}$ is equivalent to the maximum angular range of light diffusion caused by the refraction produced by the second optical member 70.

Based on these factors, it is desirable that the display device 100 should be designed for the viewing angle range $\theta_{lens}$. Specifically, the collimator 20 is provided so that the light L2 travels along the facing direction Z. The degree of refraction of the light produced by the convex lens part 61 and the degree of refraction of the light produced by the convex lens part 71 (angular range $\theta_{BL}$) are determined so that the outgoing angular range of the light that has passed through the second optical member 70 and the first optical member 60 is closer to the viewing angle range $\theta_{lens}$. These facilitate making the area for viewing the display output from the display device 100 more desirable.

More specifically, the viewing angle range $\theta_{lens}$ is obtained by the square root of the sum of the square of the incident orientation angle $\theta_{in}$ of the light entering the display panel 30 and the square of the outgoing orientation angle $\theta_{out}$ generated by the convex lens part 61 when the light enters the first optical member 60 through the display panel 30 and exits from the first optical member 60 ($\sqrt{(\theta_{in}^2+\theta_{out}^2)}$). In the embodiment, since both the incident orientation angle $\theta_{in}$ and the outgoing orientation angle $\theta_{out}$ correspond to the angular range $\theta_{BL}$, the square root of the doubled value of the squared value of the angular range $\theta_{BL}$ is preferably closer to the viewing angle range $\theta_{lens}$. In practice, since the aforementioned pitch p is also taken into account when the viewing angle range $\theta_{lens}$ is determined, it is desirable that the angular range $\theta_{BL}$ Should be determined taking these circumstances into account.

Herein, the second distance d2, which is the distance between the reference line BL and the second optical member 70, is significantly greater than a first distance d1, which is the distance between the reference line BL and each of the first optical members 60 in the facing direction Z. In the embodiment, the second distance d2 is greater than twice the first distance d1 (d2>2d1). In other words, the first distance d1 is smaller than the second distance d2.

The rays of light of "−4", "−3", "−2", "−1", "0", "1", "2", "3", and "4" illustrated in FIG. 6 respectively form images that are viewed from different viewpoints, on the opposite side to the display panel 30 with the first optical member 60 interposed therebetween. This establishes a multi-view. When the viewing angle range $\theta_{lens}$ is the optimum viewing range, the reversed image of an intended image obtained by flipping the intended image in the first direction X is viewed at "−4" and "4". That is, the angular range outside the viewing angle range $\theta_{lens}$ is a reverse viewing range. In the example illustrated in FIG. 6, the collimator 20 causes the light L2 to travel along the facing direction Z, and the degree of refraction of the light produced by the convex lens part 71 corresponds to the angular range $\theta_{BL}$, thereby reducing the production of light with angles corresponding to "−4" and "4".

In the embodiment, the color of light emitted from the light source 10 is light in colors (for example, white (W)) including wavelength bands capable of reproducing each of the red (R), green (G), and blue (B) colors. In the embodiment, light passes through the color filter layer of each sub-pixel 49, whereby light corresponding to the color of the sub-pixel 49 travels from the display panel 30 to the first optical member 60.

In the embodiment, as described above, the display panel 30 and the first optical member 60 are substantially identical in shape and area when viewed from the front viewpoint. Since the first optical member 60 and the second optical member 70 are the same optical members in the embodiment, the display panel 30 and the second optical member 70 are substantially identical in shape and area when viewed from the front viewpoint. However, technically, the shape and area of the Fresnel lens 22 and the second optical member 70 when viewed from the front viewpoint may be smaller than those of the display panel 30 and the first optical member 60. In short, those members may each have any shape and area as long as the display area OA (see FIG. 2) is irradiated with light diffused by the second optical member 70 when the diffused light reaches the display panel 30.

The following describes the relation between the first optical member 60 and the second optical member 70 with reference to FIGS. 7 and 8.

FIG. 7 is a schematic view from the front viewpoint illustrating the longitudinal direction of the convex lens part 61 in the first optical member 60. As described with reference to FIGS. 4 and 5, the longitudinal direction of the convex lens part 61 is along the first extending direction V1. Thus, when viewed from the front viewpoint, the first optical member 60 has a configuration in which the convex lens parts 61 extending along the first extending direction V1 are arranged, as illustrated in FIG. 7. Herein, the angle between the second direction Y and the first extending direction V1 is assumed to be an angle φ, as illustrated in FIG. 7.

FIG. 8 is a schematic view from the front viewpoint illustrating the longitudinal direction of the convex lens part 71 in the second optical member 70. As illustrated in FIG. 8, when the second optical member 70 is viewed from the front viewpoint, the longitudinal direction of the convex lens part 71 is the direction intersecting the first direction X and the second direction Y. Specifically, the longitudinal direction of the convex lens part 71 is along a second extending direction V2 illustrated in FIG. 8. Herein, the first extending direction V1 illustrated in FIG. 7 and the second extending direction V2 illustrated in FIG. 8 are line symmetric with respect to the second direction Y. In FIG. 8, the angle between the second direction Y and the second extending direction V2 is illustrated as an angle −φ. The magnitude of the angle φ illustrated in FIG. 7 is equal to the magnitude of the angle −φ. Consequently, as illustrated in the relation between FIG. 8 and FIG. 7, it can be said that the convex lens part 71 of the second optical member 70 is inclined in the opposite direction to the inclination direction of the convex lens part 61 of the first optical member 60 with the second direction Y as the axis. The first extending direction V1 and the second extending direction V2 are along the X-Y plane.

In this manner, the first extending direction V1, which is the extending direction of the convex lens part 61, and the second extending direction V2, which is the extending direction of the convex lens part 71, are directions that are orthogonal to the facing direction (facing direction Z) in which the first optical member 60 and the second optical member 70 face each other, and that also intersect both of the first direction (first direction X), in which the convex lens parts 61 and the second optical member 70 are arranged, and the second direction (second direction Y), which is orthogonal to the facing direction and the first direction. The first extending direction V1 and the second extending direction V2 are line symmetric with respect to the second direction.

Such a second optical member 70 can be provided by reversing the front and back of a lenticular lens having the same shape as that of the first optical member 60. In the embodiment, two lenticular lenses having the shape of the first optical member 60 described with reference to FIGS. 3 through 7 are prepared, and one of the two lenticular lenses is provided in the display device 100 as the first optical member 60. The other of the two lenticular lenses is provided as the second optical member 70 so that the front-back relation when viewed from the front viewpoint is opposite to that of the one (first optical member 60) of the two lenticular lenses. This is synonymous with the fact that, when the side having a curvature in the lenticular lens is the front side and the flat side opposite to the front side is the back side, each of the first optical member and the second optical member is provided so that the back side thereof faces the display panel (display panel 30). As illustrated in FIGS. 1 and 6, the first optical member 60 has the other surface 60B facing the display panel 30 side. The second optical member 70 has the other surface 70B facing the display panel 30. With this configuration, the first optical member 60 and the second optical member 70 can be provided in the display device 100 by using two optical members having the same shape. Consequently, it is desirable that the radius of curvature, focal distance, etc., of the optical members should be determined so that the relation between the viewing angle range $\theta_{lens}$ and the angular range $\theta_{BL}$ described above is established.

The following describes light diffusion caused by a combination of the second optical member 70 and the first optical member 60 with reference to FIGS. 9 through 12.

Figure 9:
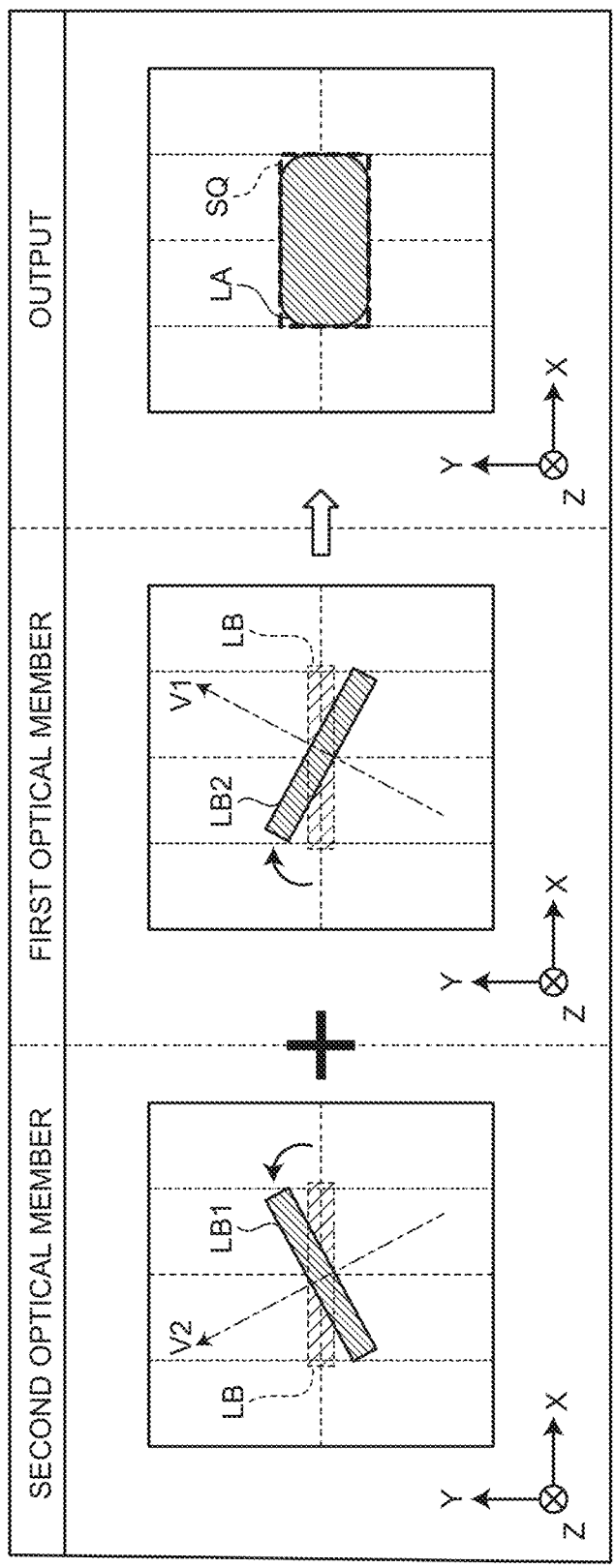
FIG. 9 is a schematic view illustrating light diffusion caused by a combination of the second optical member and the first optical member.

FIG. 9 is a schematic view illustrating light diffusion caused by a combination of the second optical member 70 and the first optical member 60. As described above, the longitudinal direction of the convex lens part 71 of the second optical member 70 is the second extending direction V2. This indicates that the focal axis of the convex lens part 71 (convex lens) of the second optical member 70 is along the second extending direction V2. For example, a parallelogram-shaped light having the longitudinal direction along the second extending direction V2 and overlapping one convex lens part 71 when viewed from the front viewpoint is assumed to enter the second optical member 70 along the facing direction Z from the one surface 70A side. In this case, the parallelogram-shaped light converges at the focal point Fo (see FIG. 6) into a ray of light along the second extending direction V2, and then diffuses toward the display panel 30. Herein, the radius of curvature of the convex lens part 71 (convex lens) is along the direction along the X-Y plane and orthogonal to the second extending direction V2. Consequently, the direction in which the convergence and diffusion of light by the convex lens part 71 is maximized is along the direction along the X-Y plane and orthogonal to the second extending direction V2. Such relation between the second extending direction V2 and the radius of curvature of the convex lens part 71 causes a difference between the light distribution of the light L2 before entering the convex lens part 71 and the distribution of light scattered after convergence by passing through the convex lens part 71.

As an example, a case is assumed in which the light distribution of the light L2 before entering the convex lens part 71 is a rectangular light band LB illustrated in the "Second optical member" column in FIG. 9. One of the two sets of two parallel opposing sides of the rectangular light band LB is along the first direction X, and the other set is along the second direction Y. The longitudinal direction of the light band LB is the first direction X. When such a light band LB enters the convex lens part 71, the light after passing through the convex lens part 71 looks like the light band LB1 illustrated in the "Second optical member" column in FIG. 9. One of the two sets of two parallel opposing sides of a rectangular light band LB1 is along the second extending direction V2, and the other set is along the direction along the X-Y plane and orthogonal to the second extending direction V2.

As described above, the longitudinal direction of the convex lens part 61 of the first optical member 60 is the first extending direction V1. This indicates that the focal axis of the convex lens part 61 (convex lens) of the first optical member 60 is along the first extending direction V1. Herein, the radius of curvature of the convex lens part 61 (convex lens) is along the direction along the X-Y plane and orthogonal to the first extending direction V1. Consequently, the direction in which the convergence and diffusion of light by the convex lens part 61 is maximized is along the direction along the X-Y plane and orthogonal to the first extending direction V1. Such relation between the first extending direction V1 and the radius of curvature of the convex lens part 61 causes a difference between the distribution of light before entering the convex lens part 61 and the distribution of light that has passed through the convex lens part 61.

As an example, a case is assumed in which the distribution of the light before entering the convex lens part 61 is the rectangular light band LB illustrated in the "First optical member" column in FIG. 9. When such a light band LB enters the convex lens part 61, the light after passing through the convex lens part 61 looks like a light band LB2 illustrated in the "First optical member" column in FIG. 9. One of the two sets of two parallel opposing sides of the rectangular light band LB2 is along the first extending direction V1, and the other set is along the direction along the X-Y plane and orthogonal to the first extending direction V1.

The optical properties of the convex lens part 71 described in the "Second optical member" column in FIG. 9 and the optical properties of the convex lens part 61 described in the "First optical member" column in FIG. 9 both affect the light passing through the display panel 30 during the display output by the display device 100. Thus, when the distribution of light at the time of the light L2 is the light band LB, the distribution of the light at the time of the display output by the display device 100 is a distribution like a light area LA illustrated in the "Output" column in FIG. 9. The light area LA is a rounded rectangle with the four corners of a rectangle SQ rounded off. One of the two sets of two parallel opposing sides of the rectangle SQ is along the first direction X, and the other set is along the second direction Y. The longitudinal direction of the rectangle SQ is the second direction Y. The width of the rectangle SQ in the first direction X is significantly greater than the width of the light band LB.

Figure 10:
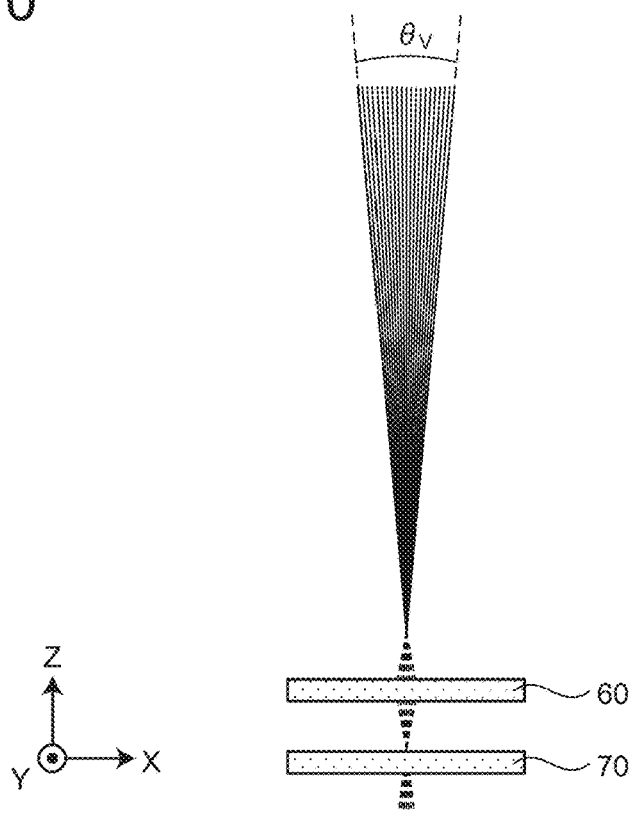
FIG. 10 is a schematic diagram illustrating the degree of diffusion of light passing through the second optical member and the first optical member.
Figure 11:
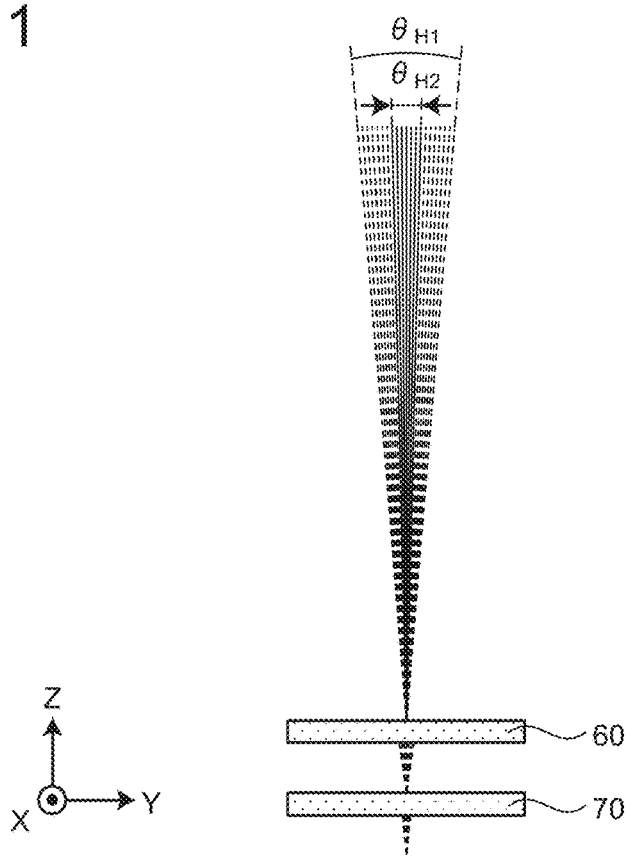
FIG. 11 is a schematic diagram illustrating the degree of diffusion of light passing through the second optical member and the first optical member.

FIGS. 10 and 11 are schematic diagrams illustrating the degree of diffusion of light passing through the second optical member 70 and the first optical member 60. FIG. 10 is a diagram in which the plane orthogonal to the second direction Y (X-Z plane) is viewed from the front viewpoint. FIG. 11 is a diagram in which the plane orthogonal to the first direction X (Y-Z plane) is viewed from the front viewpoint.

The diffusion of light in the first direction X, such as an angle $\theta_V$ illustrated in FIG. 10, is generally established with either the first optical member 60 or the second optical member 70. In the embodiment, the angle $\theta_V$ illustrated in FIG. 10 is adjusted to be in the viewing angle range $\theta_{lens}$ illustrated in FIG. 6, as described with reference to FIG. 6. What is illustrated with reference to FIG. 10 is that the diffusion of light in the first direction X can also be achieved sufficiently by one optical member that is what is called a lenticular lens, like the first optical member 60 or the second optical member 70, by adjusting the radius of curvature thereof to the viewing angle range $\theta_{lens}$.

On the contrary, the diffusion of light in the second direction Y, such as an angle $\theta_{H1}$ illustrated in FIG. 11, is established by using both the first optical member 60 and the second optical member 70. If only one of the first optical member 60 and the second optical member 70 is provided, only light diffusion having about the angle $\theta_{H2}$ illustrated in FIG. 11 occurs. The angle $\theta_{H2}$ is significantly narrower than the angle $\theta_{H1}$.

As described with reference to FIGS. 10 and 11, providing both the first optical member 60 and the second optical member 70 allows both the achievement of multi-view for a plurality of viewpoints aligned in the first direction X and a greater diffusion of light in the second direction Y at the same time. Consequently, according to the embodiment, the viewing angle in the second direction Y can be larger in a display device with a multi-view function.

Figure 12:
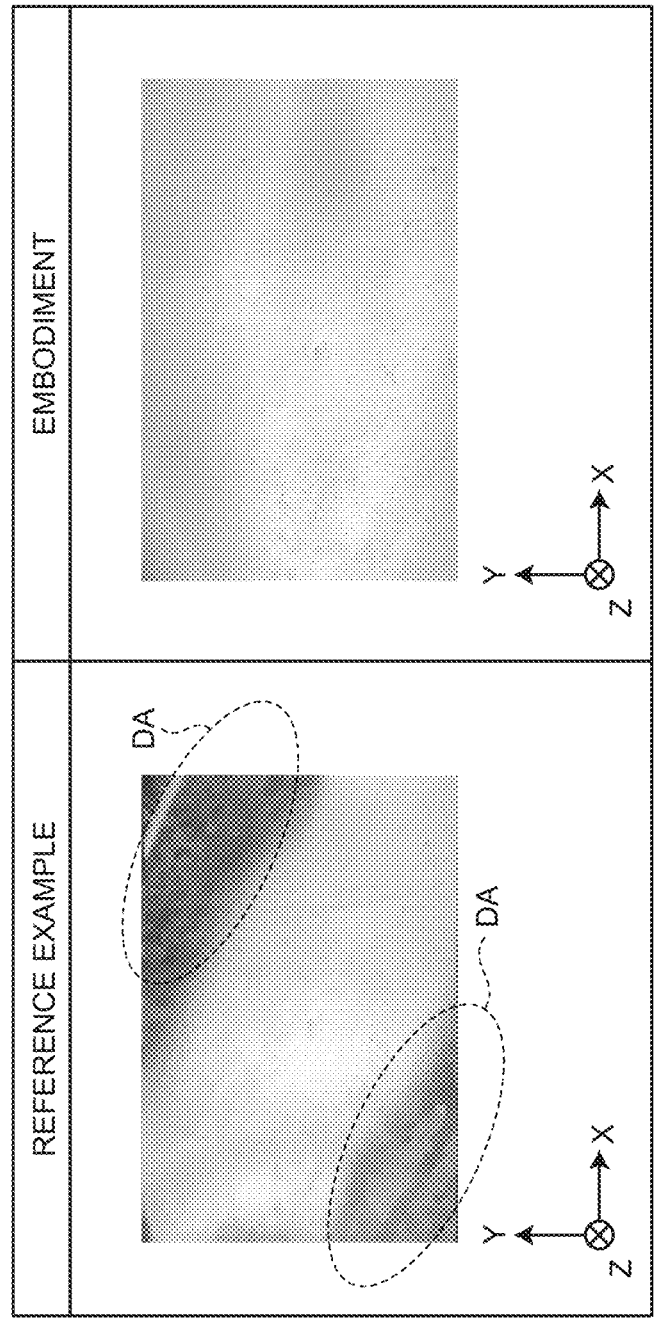
FIG. 12 is a diagram illustrating the difference between light distribution according to a reference example and light distribution according to an embodiment.

FIG. 12 is a diagram illustrating the difference between light distribution according to a reference example and light distribution according to the embodiment. A display device of the reference example does not include the Fresnel lens 22 and the second optical member 70 that are included in the configuration of the display device 100. That is, the display device of the reference example is a display device in which diffused light from a light source directly enters the display panel 30, and light passing through the display panel 30 is directed to each of the viewpoints by the first optical member 60.

In the display device of the reference example, the optical effect of the first optical member 60 that changes the light band LB into the light band LB2 (see the "First optical member" column in FIG. 9) occurs, but the optical effect of the second optical member 70 that changes the light band LB into the light band LB1 (see the "Second optical member"

column in FIG. 9) does not occur. Thus, an oblique portion appears significantly in the light distribution as illustrated "Reference example" in FIG. 12. Specifically, dark areas DA near two of the four corners of the rectangular display area that are located on the same diagonal line are significantly darker than the other areas.

In contrast to this, according to the embodiment, a distribution such as the light area LA illustrated in the "Output" column in FIG. 9 can be obtained at the time of the display output, as described with reference to FIG. 9. This can reduce the occurrence of dark portions such as the dark areas DA in the reference example and achieve display output with a more even light distribution, as illustrated in the "Embodiment" column in FIG. 12.

Although FIG. 1 illustrates the light source used for the display output of the display device 100 is the single light source 10, this is merely an example, and the specific configuration of the light source is not limited to this.

Figure 13:
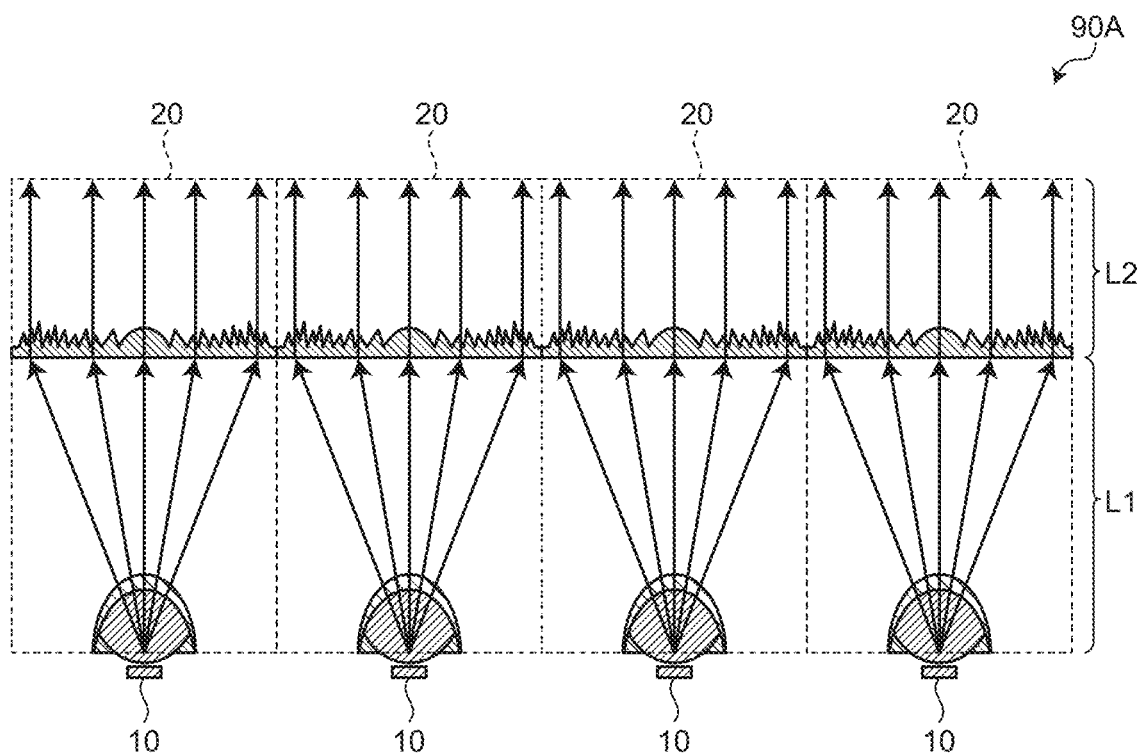
FIG. 13 is a schematic diagram illustrating an example of a light source configuration different from that in FIG. 1.

FIG. 13 is a schematic diagram illustrating a configuration example of a light source part 90A different from the light source part in FIG. 1. As illustrated in FIG. 13, light from a plurality of the light sources 10 can be changed into the light L2 by placing the light sources 10 and providing an individual collimator 20 for each light source 10.

As described above, according to the embodiment, the display device includes a display panel (display panel 30) having a display area (display area OA) in which a plurality of pixels are provided, a first optical member (first optical member 60) provided on the display surface side of the display panel so as to cover the display area, a second optical member (second optical member 70) provided on the opposite side to the first optical member with the display panel interposed therebetween, and a light source part (light source part 90 or light source part 90A) that is provided on the opposite side to the display panel with the second optical member interposed therebetween and is configured to emit light an optical path of which is along a facing direction (facing direction Z) in which the first optical member and the second optical member face each other. The first optical member includes a plurality of convex lens parts (convex lens parts 61) arranged in the first direction (first direction X) orthogonal to the facing direction. The second optical member includes a plurality of convex lens parts (convex lens parts 71) arranged in the first direction (first direction X). The convex lens parts (convex lens part 61 and convex lens part 71) have a curvature in the first direction and no curvature in the extending direction (first extending direction V1 or second extending direction V2). The extending direction is a direction that is orthogonal to the facing direction (facing direction Z) and that intersects both the first direction and the second direction (second direction Y) that is orthogonal to the facing direction and the first direction, and the extending direction of the convex lens part of the first optical member (first extending direction V1) and the extending direction of the convex lens part of the second optical member (second extending direction V2) are line symmetric with respect to the second direction.

According to the embodiment, a multi-view function can be achieved by the convex lens parts (convex lens parts 61) included in the first optical member (first optical member 60). Since the extending direction of the convex lens part of the first optical member (first extending direction V1) and the extending direction of the convex lens part of the second optical member (second optical member 70) (second extending direction V2) are line symmetrical, two-dimensional spreading of light from the light source part (light source part 90 or light source part 90A) can be more uniform (for example, see FIG. 12). Furthermore, since the optical path of the light from the light source part is an optical path along the facing direction (facing direction Z) in which the first optical member and the second optical member face each other, the design for the degree of refraction of light by the first optical member and the second optical member can be further facilitated. Consequently, the angular range of the output light is easily limited to a range closer to the assumed viewing angle range (viewing angle range $\theta_{lens}$).

The first optical member (first optical member 60) and the second optical member (second optical member 70) are lenticular lenses having the same shape. When the side having a curvature in the lenticular lens is the front side and the flat side opposite to the front side is the back side, each of the first optical member and the second optical member is provided so that the back side faces the display panel (display panel 30). With this configuration, the first optical member and the second optical member can have the same configuration, thereby increasing productivity. The optical properties to be adjusted for the assumed viewing angle range (viewing angle range $\theta_{lens}$) can also be limited easily to the optical properties of the lenticular lens (for example, angular range $\theta_{BL}$). Consequently, it is easier to design to limit the angular range of the output light to a range closer to the assumed viewing angle range (viewing angle range $\theta_{lens}$).

The first distance (first distance d1) is smaller than the second distance (second distance d2). The first distance is the distance between the first optical member (first optical member 60) and the pixel electrodes (pixel electrodes 490) provided on the display panel (display panel 30), and the second distance is the distance between the second optical member (second optical member 70) and the pixel electrodes. With this configuration, both spreading of light in the second direction (second direction Y) by the second optical member and the multi-view function by the first optical member can be achieved more easily at the same time. In particular, the second distance being greater than twice the first distance can ensure both further.

The light source part (light source part 90 or light source part 90A) includes a light source (light source 10) that emits scattered light toward the second optical member (second optical member 70) and a third optical member (Fresnel lens 22) that guides an optical path of the light emitted from the light source, in the direction along the facing direction (facing direction Z). With this configuration, the light source part that emits light the optical path of which is along the facing direction can be achieved easily.

Of the detailed design matters of the display panel 30, such as the arrangement of the pixels 48 provided in the display area OA of the display panel 30, the number of the sub-pixels 49 provided in one pixel 48, and the arrangement of the sub-pixels 49, those illustrated in FIGS. 2 through 4 are merely examples, and may be modified as appropriate. Various other matters not included in the matters limited by the invention-specific matters recited in the claims are not limited to those exemplified in the description of embodiments, and may be modified as appropriate.

It is also understood that, regarding any other operations and effects that are brought about by the aspects described in the present embodiment, those that are obvious from the description of the present specification or that can be conceived of by a person skilled in the art are naturally brought about by the present disclosure.

What is claimed is:

1. A display device comprising:
   a display panel having a display area in which a plurality of pixels are provided;
   a first optical member provided on a display surface side of the display panel so as to cover the display area;
   a second optical member provided on an opposite side to the first optical member with the display panel interposed therebetween; and
   a light source part that is provided on an opposite side to the display panel with the second optical member interposed therebetween and is configured to emit light an optical path of which is along a facing direction in which the first optical member and the second optical member face each other, wherein
   each of the first optical member and the second optical member comprises a plurality of convex lens parts arranged in a first direction orthogonal to the facing direction,
   the convex lens parts each have a curvature in the first direction and no curvature in an extending direction,
   the extending direction is a direction that intersects both the first direction and a second direction orthogonal to the first direction, when viewed from the facing direction orthogonal to the first direction, the second direction, and the extending direction, and
   a first extending direction that is the extending direction of each convex lens part of the first optical member and a second extending direction that is the extending direction of each convex lens part of the second optical member are line symmetric with respect to the second direction, when viewed from the facing direction.

2. The display device according to claim 1, wherein
   the first optical member and the second optical member are lenticular lenses having a same shape, and
   when a side having a curvature in each lenticular lens is a front side and a flat side opposite to the front side is a back side, each of the first optical member and the second optical member is provided so that the back side faces the display panel.

3. The display device according to claim 1, wherein a first distance is smaller than a second distance, the first distance is a distance between the first optical member and a pixel electrode provided on the display panel, and the second distance is a distance between the second optical member and the pixel electrode.

4. The display device according to claim 3, wherein the second distance is greater than twice the first distance.

5. The display device according to claim 1, wherein the light source part includes:
   a light source configured to emit scattered light toward the second optical member; and
   a third optical member configured to guide an optical path of the light emitted from the light source, in a direction along the facing direction.

6. The display device according to claim 1, wherein the first extending direction and the second extending direction are different and opposed to each other with respect to the second direction, when viewed from the facing direction.

7. The display device according to claim 1, further comprising:
   a plurality of scan lines each extending in the first direction; and
   a plurality of signal lines each extending in the second direction, wherein
   the pixels are arranged in a matrix of the first direction and the second direction.

* * * * *